(12) United States Patent
Pietrala et al.

(10) Patent No.: US 11,040,833 B2
(45) Date of Patent: Jun. 22, 2021

(54) FLIGHT BAR-CLAMP-CHAIN LINK CONNECTION FOR A CHAIN CONVEYOR

(71) Applicant: Caterpillar Global Mining Europe GmbH, Lünen (DE)

(72) Inventors: Christoph Pietrala, Dortmund (DE); Matthias Köhler, Lünen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 374 days.

(21) Appl. No.: 15/781,629

(22) PCT Filed: Dec. 9, 2016

(86) PCT No.: PCT/EP2016/002081
§ 371 (c)(1),
(2) Date: Jun. 5, 2018

(87) PCT Pub. No.: WO2017/097428
PCT Pub. Date: Jun. 15, 2017

(65) Prior Publication Data
US 2020/0262653 A1 Aug. 20, 2020

(30) Foreign Application Priority Data
Dec. 10, 2015 (EP) .................. 151992330

(51) Int. Cl.
*B65G 19/24* (2006.01)
*B65G 19/08* (2006.01)
(Continued)

(52) U.S. Cl.
CPC ............. *B65G 19/24* (2013.01); *B65G 19/08* (2013.01); *B65G 17/38* (2013.01); *B65G 19/20* (2013.01);
(Continued)

(58) Field of Classification Search
None
See application file for complete search history.

(56) References Cited

U.S. PATENT DOCUMENTS 3,421,990 A * 1/1969 Penix ..................... C23F 13/06
204/196.15
4,510,032 A 4/1985 Timmington
(Continued)

FOREIGN PATENT DOCUMENTS

AU 763637 B2 7/2003
CN 101875433 11/2010
(Continued)

OTHER PUBLICATIONS

European Search Report for related International Application No. EP 15199230; report dated May 18, 2016.
(Continued)

*Primary Examiner* — Kavel Singh
(74) *Attorney, Agent, or Firm* — von Briesen & Roper, s.c.

(57) ABSTRACT

The present disclosure relates to a flight bar clamp for connecting a flight bar to at least one chain link of at least one conveyor chain of a chain conveyor used in underground mining. The flight bar clamp comprises a clamp main body extending along a clamp longitudinal axis, and at least one chain link engaging portion disposed at the clamp main body configured to engage with one chain link. The at least one chain link engaging portion of the flight bar clamp includes a sacrificial anode reception, and a sacrificial anode body disposed in the sacrificial anode reception. The sacrificial anode body may protect the flight bar clamp, the flight bar and the chains from contact corrosion.

12 Claims, 6 Drawing Sheets

(51) Int. Cl.
   *B65G 17/38*   (2006.01)
   *B65G 19/20*   (2006.01)
(52) U.S. Cl.
   CPC ............... *B65G 2812/0297* (2013.01); *B65G 2812/0298* (2013.01)

(56) References Cited

U.S. PATENT DOCUMENTS

| | | | | | |
|---|---|---|---|---|---|
| 4,600,097 | A | * | 7/1986 | Temme | B65G 19/24 198/731 |
| 4,790,425 | A | * | 12/1988 | Braun | B65G 19/24 198/731 |
| 5,069,328 | A | * | 12/1991 | Schupphaus | B65G 19/10 198/731 |
| 5,249,664 | A | * | 10/1993 | Steinkuhl | B65G 19/24 198/731 |
| 5,579,896 | A | * | 12/1996 | Braun | B65G 19/00 198/728 |
| 5,699,895 | A | | 12/1997 | Materne et al. | |
| 5,778,655 | A | | 7/1998 | Lange | |
| 5,931,283 | A | * | 8/1999 | Meya | B65G 19/24 198/731 |
| 6,595,351 | B2 | * | 7/2003 | Malitzki | B65G 19/24 198/728 |
| 7,159,707 | B2 | * | 1/2007 | Malitzki | B65G 19/22 198/731 |
| 8,162,131 | B2 | | 4/2012 | Perry | |
| 8,662,287 | B2 | * | 3/2014 | Fischer | B65G 19/24 198/731 |
| 9,487,358 | B2 | * | 11/2016 | Morris | B65G 23/06 |

FOREIGN PATENT DOCUMENTS

| | | |
|---|---|---|
| CN | 203513804 | 4/2014 |
| GB | 1404751 A | 9/1975 |
| GB | 2235675 A | 3/1991 |
| JP | 6277488 A | 4/1987 |
| JP | 2000273666 A | 10/2000 |
| WO | WO 2013/182275 A1 | 12/2013 |

OTHER PUBLICATIONS

International Search Report for related International Application No. PCT/EP2016/002081; report dated Jul. 3, 2017.

* cited by examiner

FLIGHT BAR-CLAMP-CHAIN LINK CONNECTION FOR A CHAIN CONVEYOR

CROSS-REFERENCE TO RELATED APPLICATION

This Application is a 35 USC § 371 US National Stage filing of International Application No. PCT/EP2016/002081 filed on Dec. 9, 2016 which claims priority under the Paris Convention to European Patent Application No. 15199230.2 filed Dec. 10, 2015.

TECHNICAL FIELD

The present disclosure generally relates to a chain conveyor used in underground mines. More particularly, the present disclosure relates to a flight bar, a flight bar clamp, and a flight bar-flight bar clamp assembly for connecting to a conveyor chain of a chain conveyor used in underground mining.

BACKGROUND

In underground mining, chain conveyors are used to transport excavated material. The chain conveyors typically include an upper strand and a lower strand for guiding at least one conveyor chain. The upper and lower strands longitudinally extend between two return stations. Both return stations include a sprocket for redirecting the conveyor chain(s) so that one return station redirects the conveyor chain(s) from the lower strand to the upper strand, and the other return station redirects the conveyor chain(s) from the upper strand to the lower strand. For example, the chain conveyors may be used as face conveyors extending along a longwall face in a longwall mining application, or as roadway conveyors in a (main) roadway or drift of an underground mine.

In operation, the conveyor chain(s) are driven by at least one drive unit operably connected to a sprocket accommodated in the return station. To facilitate a material transport by means of the driven conveyor chain(s) of the chain conveyor, a plurality of flight bars (scrapers) are fastened at the conveyor chain(s) in preset intervals. Specifically, the flight bars include receptions for receiving chain links of the conveyor chain, which are secured in the receptions by mounting a clamp to the flight bar.

Due to difficult environmental conditions (dust, temperature, humidity, etc.) and heavy duty demands for transporting tons of excavated material, the flight bars, clamps and conveyor chains are subject to wear. If worn components are not replaced in time, it may happen that the conveyor chain breaks which results in an undesired standstill of the mining installation.

The present disclosure is directed, at least in part, to improving or overcoming one or more aspects of prior systems.

SUMMARY OF THE DISCLOSURE

In one aspect of the present disclosure, a flight bar clamp for connecting a flight bar to at least one chain link of at least one conveyor chain of a chain conveyor used in underground mining is disclosed. The flight bar clamp may comprise a clamp main body extending along a clamp longitudinal axis. The flight bar clamp may comprise at least one chain link engaging portion disposed at the clamp main body and configured to engage with one chain link of the at least one conveyor chain. The at least one chain link engaging portion of the flight bar clamp may include a sacrificial anode reception. The flight bar clamp may comprise a sacrificial anode body disposed in the sacrificial anode reception.

In another aspect of the present disclosure, a flight bar for connecting to at least one chain link of at least one conveyor chain of a chain conveyor used in underground mining via a flight bar clamp is disclosed. The flight bar may comprise a flight bar main body extending along a flight bar longitudinal axis and including at least one chain link reception recess for receiving one chain link of the conveyor chain. The flight bar may comprise a chain link engaging portion disposed in the chain link reception recess and configured to engage with the one chain link of the at least one conveyor chain. The chain link engaging portion of the flight bar may include a sacrificial anode reception. The flight bar may comprise a sacrificial anode body disposed in the sacrificial anode reception.

In yet another aspect, the present disclosure relates to a flight bar-clamp assembly. The assembly may comprise a flight bar as exemplary disclosed herein and a flight bar clamp mountable to one another; or a flight bar clamp as exemplary disclosed herein and a flight bar mountable to one another; or a flight bar as exemplary disclosed herein and a flight bar clamp as exemplary disclosed herein mountable to one another.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
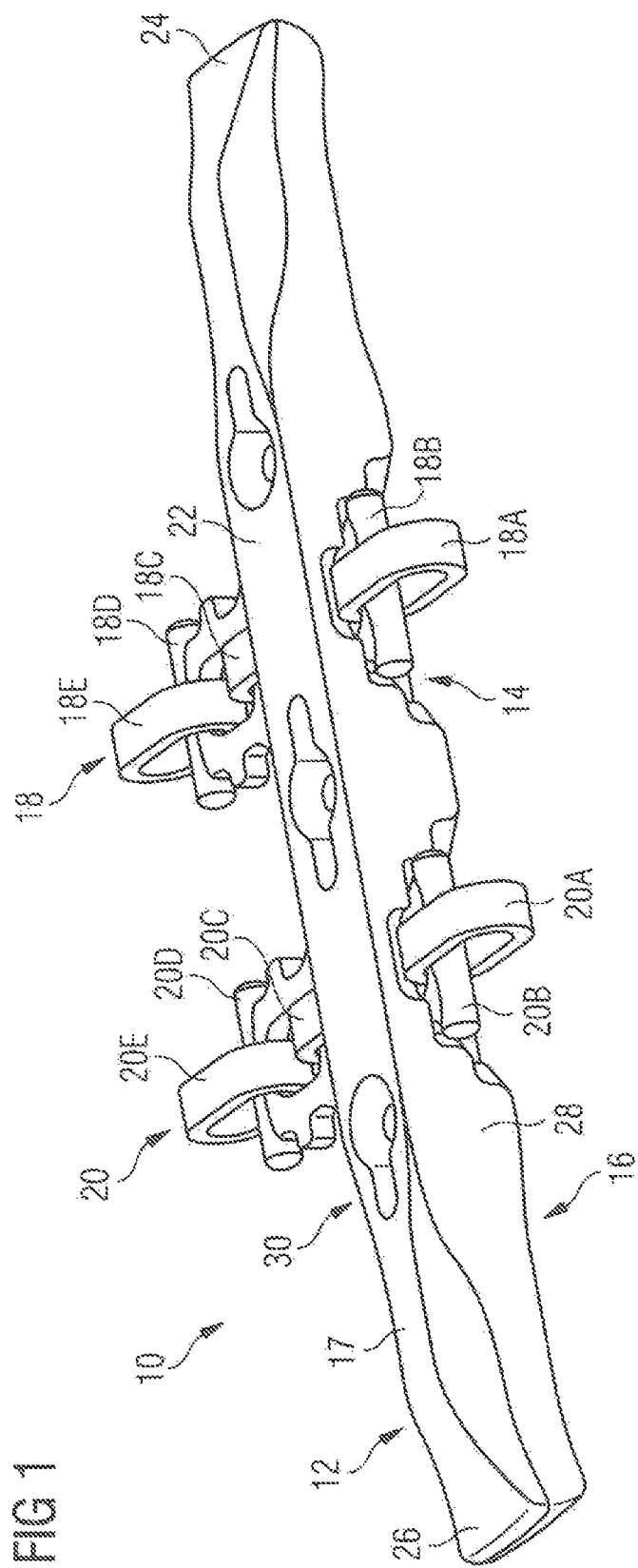
FIG. 1 shows a perspective view of an exemplary assembly including a flight bar and a flight bar clamp secured to two conveyor chain sections.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that a wear increasing influence at connection points between a flight bar, a chain link and a flight bar clamp is contact corrosion. It was found that the contact corrosion results from moisture, which remains at the contact points in form of a slurry or sludgy mixture due to particle ingress from the dusty environment. Accordingly, the present disclosure proposes to include sacrificial anodes into a flight bar-clamp-chain link assembly to reduce or prevent contact corrosion.

The present disclosure is further based in part on the realization that including a sacrificial anode into the flight bar-clamp-chain link assembly requires a sheltered reception for the sacrificial anode. The reason is that, during operation of the chain conveyor, considerable loads are applied to the conveyor chain, and thus to the connection points between the flight bar, the chain link, and the flight bar clamp. Furthermore, a load is applied between the flight bar and the flight bar clamp to hold the chain link in place. In case the sacrificial anode would be provided in a manner that is not protected from those loads, the sacrificial anode would probably break and get lost within short.

Referring to FIGS. 1 to 4, a flight bar-flight bar clamp assembly 10 is shown. The assembly 10 includes a flight bar 12 and a flight bar clamp (also referred to as clamp herein) 14. The clamp 14 is mounted to a bottom side 16 of the flight bar 12.

Figure 2:
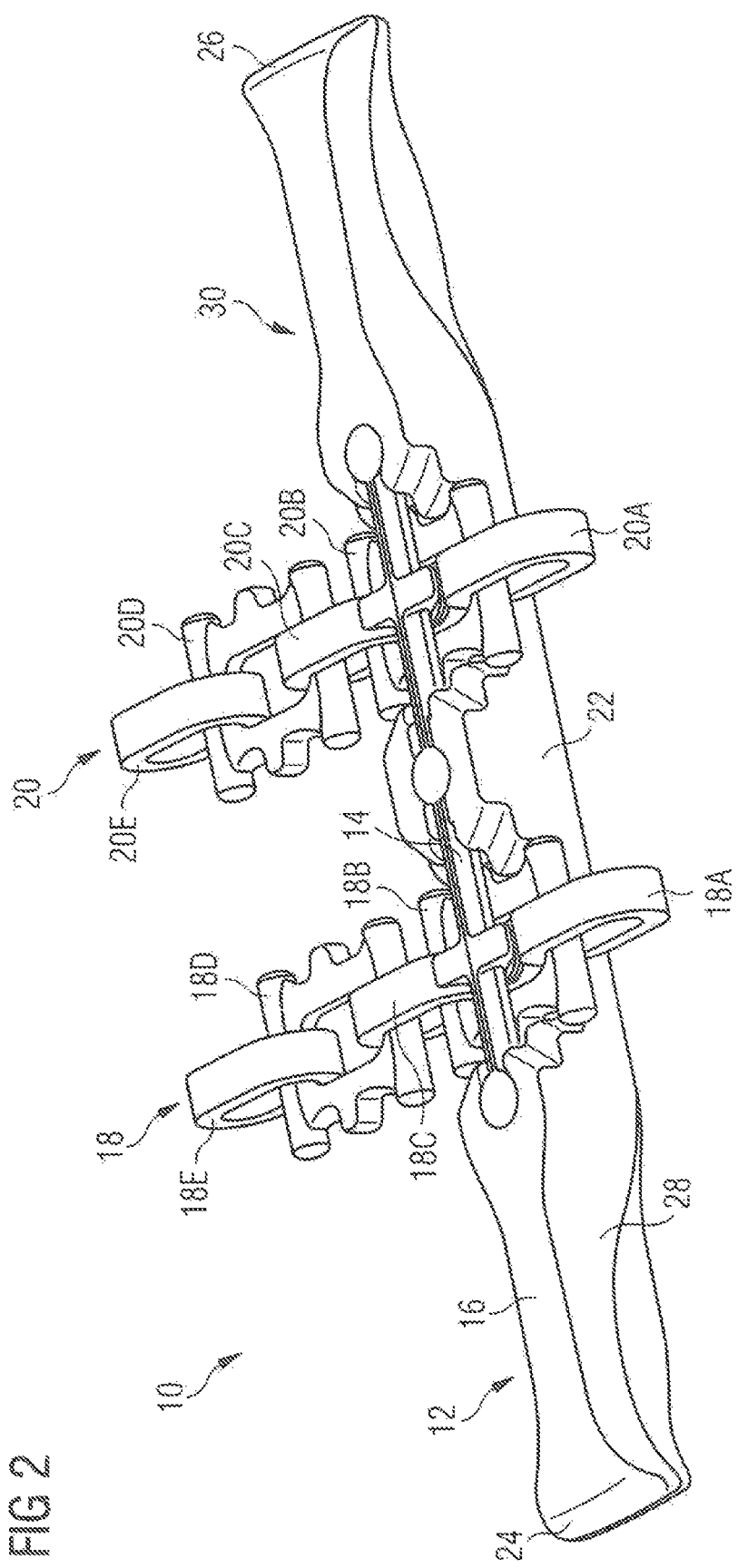
FIG. 2 shows another perspective view of the assembly of FIG. 1 from below.
Figure 4:
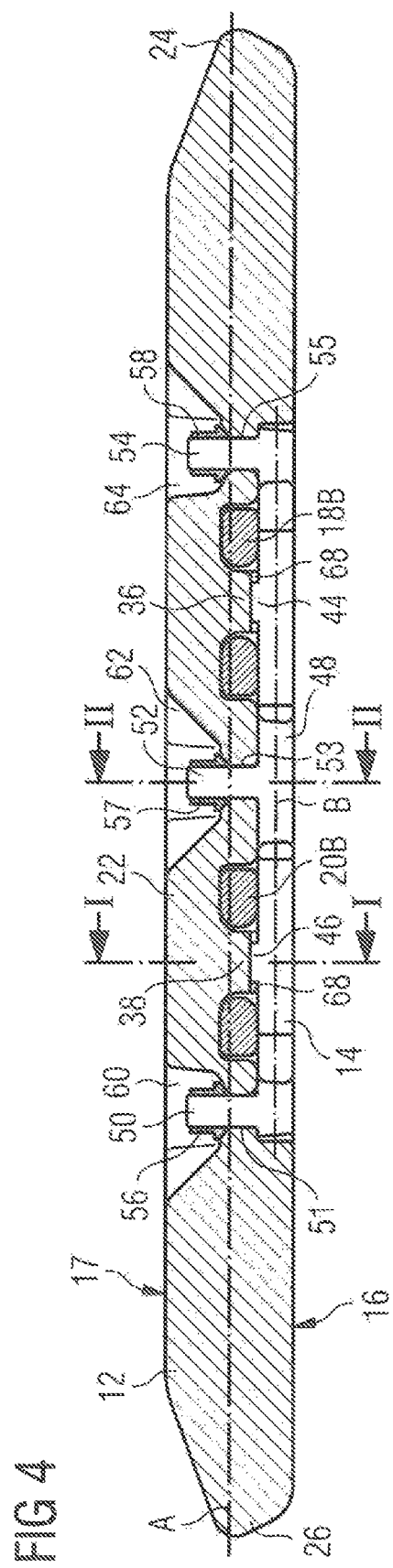
FIG. 4 shows a longitudinal cut view of the flight bar and the two conveyor chain sections, and the flight bar clamp in a side view, which secures the conveyor chain sections to the flight bar.

In FIGS. 1, 2 and 4, the flight bar 12 and the clamp 14 are fastened to a first chain 18 and a second chain 20. The first chain 18 and the second chain 20 are shown as sections of the respective chains, each section including five chain links 18A-18E and 20A-20E (see FIGS. 1 and 2), respectively. The first chain 18 and the second chain 20 may be any type of chain including annular chain links connected to one another. For example, the chains may be configured as standard round link chains, power chains, F-class chains, or S-class chains as one skilled in the art will appreciate. For example, the chain links may have a material thickness between 34 mm and 60 mm.

The first chain 18 and the second chain 20 are components of a chain conveyor. The chain conveyor (not shown in further detail) transports material by driving the first and second chains 18, 20, and thereby, a plurality of flight bars (scrapers), one of which is shown in the Figs. and referred to by reference numeral 12. The chain conveyor may be used in underground mines, for example as a face conveyor extending along a longwall face or as a roadway conveyor arranged in a roadway of the mine.

The flight bar 12 comprises a main body 22 longitudinally extending along a first longitudinal axis A (see FIG. 4) between two outer ends 24, 26, and including the bottom side 16, a top side 17 and to longitudinal sides 28, 30. In case the flight bar 12 is installed in a chain conveyor with upper and lower strands, the top side 17 is directed to a roof if the flight bar 12 moves in the upper strand. Further, the top side 17 is directed to a ground if the flight bar 12 moves upside down in the lower strand.

In some embodiments, the flight bar 12 may have a length within a range between 650 mm and 1600 mm, a width within a range between 80 mm and 150 mm, and/or a height within a range between 100 mm and 140 mm.

The main body 22 includes a first chain link reception recess 32 and a second chain link reception recess 34. The first and second chain link reception recesses 32, 34 are disposed at the bottom side 16 of the main body 22 and spaced apart from one another with respect to the first longitudinal axis A. The chain link reception recesses 32 and 34 are configured to accommodate the chain links 18B and 20B, respectively.

In some embodiments, the flight bar 12 (the main body 22) may include one chain link reception recess only, or more than two chain link reception recesses for connecting the flight bar to a corresponding number of conveyor chains.

Figure 3:
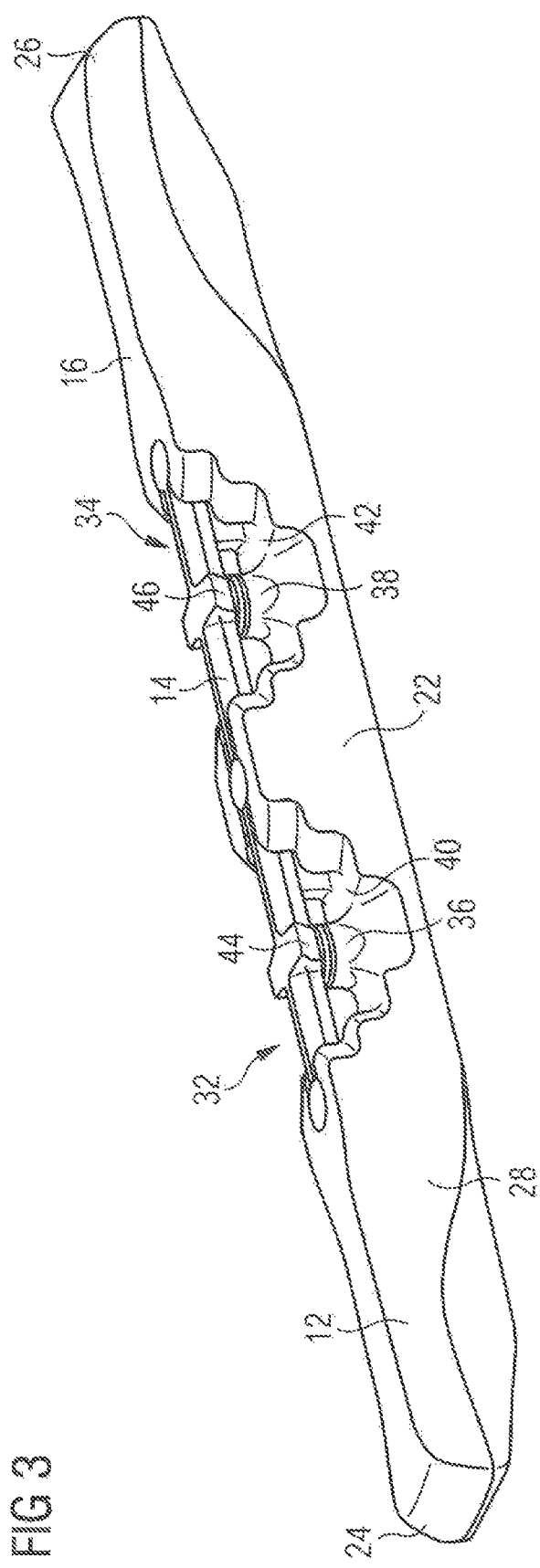
FIG. 3 shows another perspective view of the assembly of FIG. 1 from below without depicting the conveyor chain sections as shown in FIGS. 1 and 2.

The chain link reception recesses 32, 34 include a chain link engaging portion 36, 38 (see FIGS. 3, 4). In the shown embodiment, the chain link engaging portions 36, 38 are formed as protrusions extending from a bottom face 40, 42 of the respective chain link reception recess 32, 34 in a direction perpendicular to the first longitudinal axis A. Alternatively, for example, the chain link engaging portions 36, 38 may be formed as a flattened portion at the bottom face 40, 42 of the respective chain link reception recess 32, 34.

The chain link engaging portions 36, 38 of the flight bar 12 are configured to contact, engage with or at least narrow a distance to associated chain link engaging portions 44, 46 of the clamp 14 in an assembled state to securely hold a respective chain link of the conveyor chains 18, 20.

The clamp 14 comprises a main body 48 longitudinally extending along a second longitudinal axis B (see FIG. 4). Furthermore, the clamp 14 includes the chain link engaging portions 44 and 46 spaced apart from one another along the second longitudinal axis B. The first longitudinal axis A and the second longitudinal axis B extend parallel to each other.

In the shown embodiment, the chain link engaging portions 44, 46 are formed as protrusions extending from the main body 48 in a direction perpendicular to the second longitudinal axis B. Alternatively, for example, the chain link engaging portions 44, 46 may be formed as flattened portions at the main body 48 of the clamp 14.

Analogous to a number of chain link engaging portions of the flight bar 12, the clamp 14 may include one chain link engaging portion only, or more, in some embodiments.

In an assembled state, the chain link engaging portions 36 and 38 of the flight bar 12 and/or the chain link engaging portions 44 and 46 of the clamp 14 extend through the annular chain link 18B and 20B, respectively. The respective chain link 18B and 20B is securely held in place, and the flight bar-clamp assembly 10 is fastened to conveyor chains 18 and 20.

In other words, annular chain links 18B and 20 surround the engaged chain link engaging portions 36, 44 and 38, 46, respectively, in an assembled state.

As can be best seen in FIG. 4, the clamp 14 is fastened to the flight bar 12 via three mounting studs 50, 52 and 54 of the clamp 14 to assemble the flight bar-clamp assembly 10. The mounting studs 50, 52 and 54 extend through respective throughholes 51, 53, 55 of the flight bar 12. The mounting studs 50, 52, 54 are integrally formed with the main body 48, and extend in a direction perpendicular to the second longitudinal axis B. The longitudinally extending main body 48 and the three mounting studs 50, 52, 54 extending perpendicular thereto result in an E-profile shape of the clamp 14. Other embodiments may include any other number of mounting studs. For example, two mounting studs may be provided at each end of the main body to extend in a direction perpendicular to the longitudinal axis of the main body to form a C-profile shape of the clamp 14.

Three (screw) nuts 56, 57, 58 are screwed onto a respective threaded end portion of the mounting studs 50, 52, 54 to fasten the clamp 14 to the flight bar 12. Additionally or alternatively, other mounting mechanisms may be used to fasten the mounting studs of the clamp.

The throughholes 51, 53, 55 extend through the main body 22 of the flight bar 12 in a direction perpendicular to the first longitudinal axis A between the bottom side 16 and the top side 17. At the top side 17, the throughholes 51, 53, 55 open into respective recesses 60, 62, 64 arranged spaced apart from one another along the first longitudinal axis A. The recesses 60, 62, 64 provide space for providing the screw nuts 56-58, and provide space for inserting a tool for tightening and loosening the screw nuts 56-58.

In some embodiments, any other number of throughholes, mounting studs, screw nuts, etc. may be provided.

Figure 5:
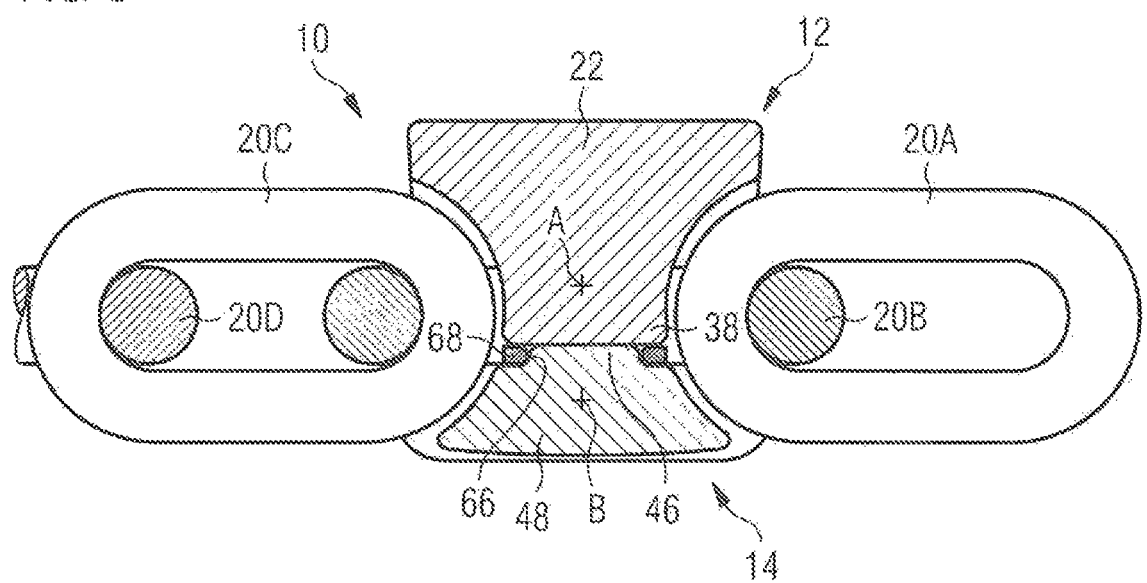
FIG. 5 shows a transverse cut view of the assembly of FIG. 4 along line I-I.

Turning to FIG. 5, a cut view through the assembly 10 along line I-I as shown in FIG. 4 is depicted.

In the shown embodiment, the chain link engaging portion 46 includes a sacrificial anode reception 66 formed as a recess. The sacrificial anode reception 66 is positioned at a top section or end section of the chain link engaging portion 46 and accommodates a replaceable sacrificial anode body 68. Similarly, the chain link engaging portion 44 includes a sacrificial anode reception to dispose a sacrificial anode body 68 therein (see FIG. 4).

The sacrificial anode reception 66 is configured as a stepped portion extending circumferentially about the top section of the chain link engaging portion 46. In other embodiments, the sacrificial anode reception 66 may have any other form suitable for accommodating a sacrificial anode body. For example, the sacrificial anode reception 66 may be formed as a groove at the top section of the chain link engaging portion 46.

Furthermore, the sacrificial anode reception 66 and the sacrificial anode body 68 are configured such that the sacrificial anode body 68 accommodated in the sacrificial anode reception 66 is protected from loads acting between the clamp 14 and the flight bar 12 in a direction perpendicular to the first longitudinal axis A as a result from securing the clamp 14 and the flight bar 12 together. Additionally, the sacrificial anode body 68 is protected from contacting the chain links 20A-20C, or is at least protected from heavy contacts by the chain links 20A-20C.

In other words, the sacrificial anode reception 66 provides a sheltered accommodation for the sacrificial anode body 68 by at least substantially accommodating the same. Stated differently, the sacrificial anode body 68 substantially extends within the confines of the sacrificial anode reception 66. Otherwise, the sacrificial anode body 68 could easily break and get lost if applying too strong loads on the same, for example by heavy contact with a chain link during operation.

Furthermore, the sacrificial anode reception 66 allows to integrate the sacrificial anode body 68 without any negative influence on the securing mechanisms between the clamp 14 and the flight bar 12. For example, assuming that a sacrificial anode body would be positioned between chain link engaging portions 38 and 46 in a manner that tightening the screw nuts 56-58 would lead to a (plastic) deformation of the sacrificial anode body, said deformation would have a negative influence on the obtainable tightening torques. The reason for the deformation is that the sacrificial anode body is typically made of a relatively soft material such as zinc or a zinc aluminum alloy. Typically, the tightening torques may be within a range between 950 NM and 1750 NM.

In the shown embodiment, the sacrificial anode body 68 is configured as an annular body, specifically a circular ring body. Alternatively, the sacrificial anode body 68 may have any other form, for example being formed as a solid body.

The sacrificial anode body 68 is positioned in the sacrificial anode reception 66 before mounting the clamp 14 and the flight bar 12 together. While securing the clamp 14 to the flight bar 12, the sacrificial anode body 68 is protected from any substantial deformation in the sacrificial anode reception 66.

In operation, the sacrificial anode body 68 serves as a sacrificial anode to reduce or prevent contact corrosion between the flight bar 12, the flight bar clamp 14, and the chains 18 and 20.

Figure 6:
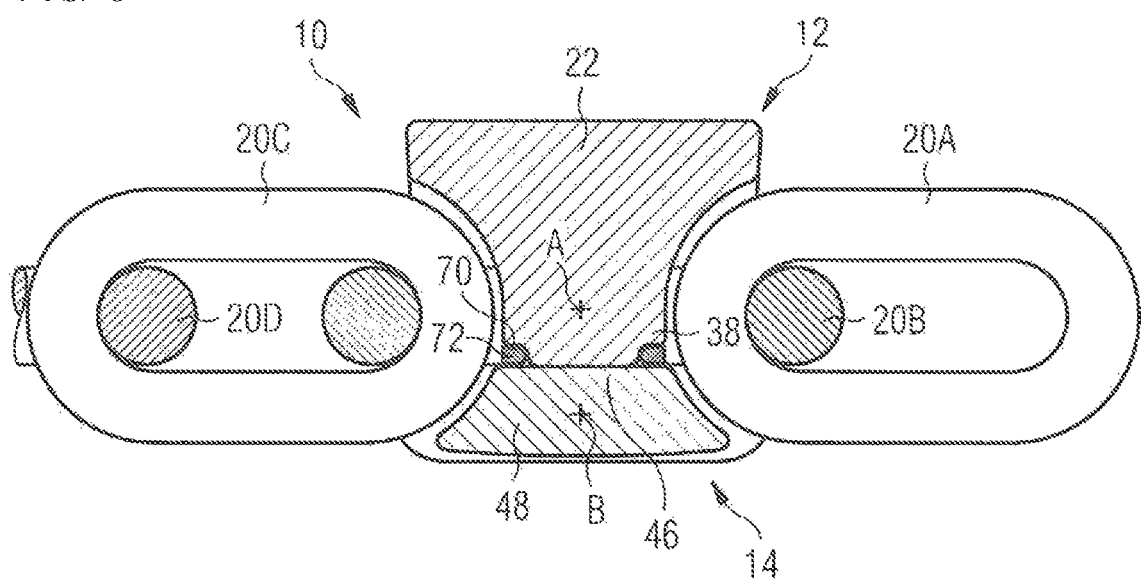
FIG. 6 shows a transverse cut view of another embodiment of the assembly, wherein the cut view is similarly taken along a line I-I as schematically indicated in FIG. 4.

Referring to FIG. 6, a cut view through another exemplary embodiment is shown.

Here, the assembly 10 includes the flight bar 12 and the flight bar clamp 14 similar to the embodiment explained with reference to FIGS. 1 to 5 except that the chain link engaging portion 38 of the flight bar 12 includes a sacrificial anode reception 70 with a sacrificial anode body 72. Specifically, the sacrificial anode reception 70 is provided at a bottom section or end section of the chain link engaging portion 38.

In some embodiments (not shown in the Figs.), the chain link engaging portions of both the flight bar and the flight bar clamp may include sacrificial anode receptions. For example, a chain link engaging portion of the flight bar may include a sacrificial anode reception at a bottom section thereof (similar to chain link engaging portion 38 shown in FIG. 6), the chain link engaging portion of the flight bar clamp may include a further sacrificial anode reception at a top section thereof (similar to chain link engaging portion 46 shown in FIG. 5), and a common sacrificial anode body may be disposed in both sacrificial anode receptions.

Figure 7:
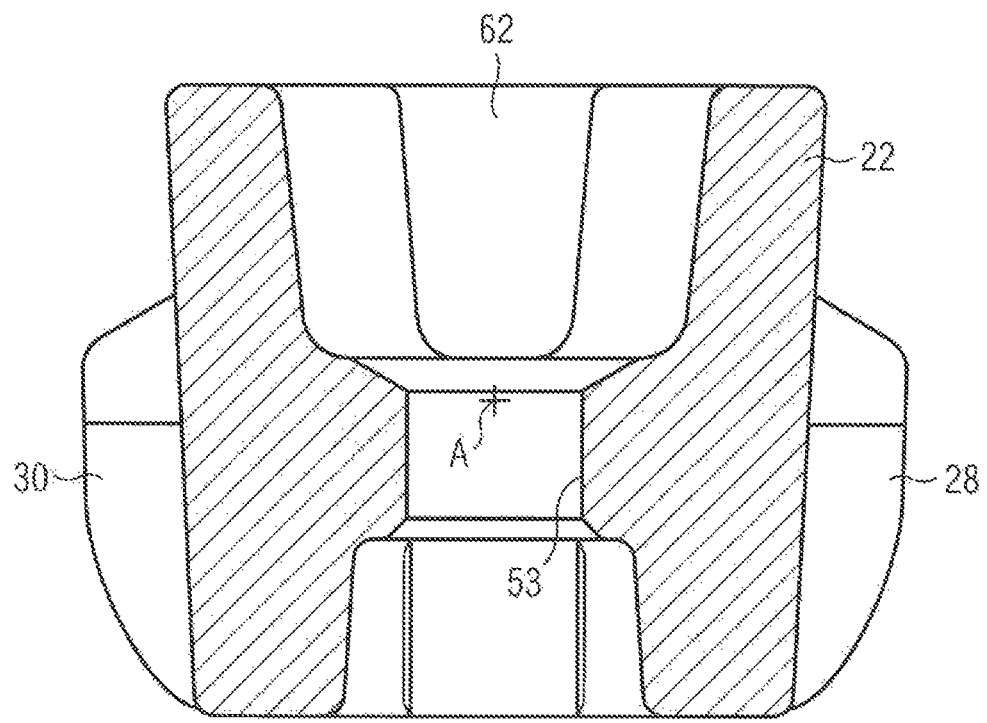
FIG. 7 shows another transverse cut view of the assembly of FIG. 4 along line II-II.

Referring now to FIG. 7 which shows a cut view through the flight bar 12 of FIG. 4 along line II-II.

As can be seen, the cross section includes an H-profile in a plane perpendicular to the flight bar longitudinal axis A, wherein the intermediate leg of the H-profile is cut through by the throughhole 53 for receiving the mounting stud 52 (see FIG. 4). Said "cut through" H-profile provides stability and rigidity to the flight bar 12 in a region of the flight bar 12 which is subject to high loads and stresses due to the fixed driven and pre-tensioned conveyor chains 18 and 20 encompassing that region. The pretension for the conveyor chains may depend on the drive power and the specific load situation.

Furthermore, referring back to FIGS. 5 and 6, the cross section of the flight bar 12 in a plane perpendicular to the flight bar longitudinal axis A is solid without any throughholes weakening the structure. Said cross section is obtained by arranging the throughhole 51, 53, 55 spaced apart from the chain link engaging portions 36, 38 of the flight bar 12 with respect to the flight bar longitudinal axis A. Again, the cross-section provides stability and rigidity to the flight bar 12 in a region of the flight bar 12 which is subject to high loads and stresses due to the fixed driven conveyor chains 20 in this region.

INDUSTRIAL APPLICABILITY

The flight bar, the flight bar clamp and the flight bar-flight bar clamp assembly as exemplary disclosed herein are particularly applicable for connecting to conveyor chains of a chain conveyor used in underground mines having challenging environmental conditions. However, one skilled in the art will appreciate, that the flight bar, the flight bar clamp and the flight bar-flight bar clamp assembly may be used with other chain conveyors another under other environmental conditions.

In another aspect of the present disclosure, a sacrificial anode body is disclosed. The sacrificial anode body may be configured to be inserted into a correspondingly formed sacrificial anode reception of a flight bar and/or a flight bar clamp.

For example, the sacrificial anode may be formed as a ring body, particularly a circular ring body, or a solid body.

The ring body may have an inner diameter approximately within a range between 25 mm and 35 mm, and may have an outer diameter approximately within a range between 45 mm and 70 mm.

The solid body may have an outer diameter within a range between 25 mm and 70 mm.

If not indicated otherwise herein by explicit reference to a specific feature, terms such as "about", "around", "approximately", or "substantially" as used herein when referring to a measurable value such as a parameter, an amount, a temporal duration, and the like, is meant to encompass variations of +/−10% or less, preferably +1−5% or less, more preferably +1/−1% or less, and still more preferably +0.1/−0.1% or less of and from the specified value, insofar as such variations are appropriate to perform in the disclosed invention. It is to be understood that the value to which the modifier "about" refers is itself also specifically, and preferably, disclosed. The recitation of numerical ranges by endpoints includes all numbers and fractions subsumed within the respective ranges, as well as the recited endpoints.

Although the preferred embodiments of this invention have been described herein, improvements and modifications may be incorporated without departing from the scope of the following claims.

The invention claimed is:

1. A flight bar clamp for connecting a flight bar to at least one chain link of at least one conveyor chain of a chain conveyor used in underground mining, the flight bar clamp comprising:
   a clamp main body extending along a clamp longitudinal axis;
   at least one chain link engaging portion disposed at the clamp main body and configured to engage with one chain link of the at least one conveyor chain, the at least one chain link engaging portion of the flight bar clamp including a sacrificial anode reception, wherein the sacrificial anode reception is formed as a recess, a stepped portion, or a groove at an end section of the chain link engaging portion; and
   a sacrificial anode body disposed in the sacrificial anode reception, wherein the sacrificial anode reception and the sacrificial anode body are configured so that the sacrificial anode body is substantially accommodated in the sacrificial anode reception.

2. The flight bar clamp of claim 1, wherein:
   the at least one chain link engaging portion of the flight bar clamp is formed as a protrusion extending from the clamp main body; or
   the at least one chain link engaging portion of the flight bar clamp is formed as a flattened portion at the clamp main body.

3. The flight bar clamp of claim 1, further including a plurality of mounting studs extending from the clamp main body.

4. The flight bar clamp of claim 3, wherein:
   the mounting studs are spaced apart from the at least one chain link engaging portion, and/or
   the mounting studs are integrally formed with the clamp main body.

5. The flight bar clamp of claim 1, wherein:
   the flight bar clamp has an E-shaped profile with three mounting studs extending from the clamp main body in a direction perpendicular to the clamp longitudinal axis; or
   the flight bar clamp has a C-shaped profile with two mounting studs extending from the clamp main body in a direction perpendicular to the longitudinal axis.

6. A flight bar for connecting to at least one chain link of at least one conveyor chain of a chain conveyor used in underground mining via a flight bar clamp, the flight bar comprising:
   a flight bar main body extending along a flight bar longitudinal axis and including at least one chain link reception recess for receiving one chain link of the conveyor chain,
   a chain link engaging portion disposed in the chain link reception recess and configured to engage with the one chain link of the at least one conveyor chain, the chain link engaging portion of the flight bar including a sacrificial anode reception, wherein the sacrificial anode reception is formed as a recess, a stepped portion, or a groove at an end section of the chain link engaging portion; and
   a sacrificial anode body disposed in the sacrificial anode reception, wherein the sacrificial anode reception and the sacrificial anode body are configured so that the sacrificial anode body is substantially accommodated in the sacrificial anode reception.

7. The flight bar of claim 6, wherein:
   the chain link engaging portion of the flight bar is formed as a protrusion extending from a bottom face of the at least one chain link reception; or
   the chain link engaging portion of the flight bar is formed as a flattened portion in the at least one chain link reception recess.

8. The flight bar of claim 6, wherein the flight bar main body further includes a plurality of throughholes for receiving mounting studs of the flight bar clamp.

9. The flight bar of claim 8, wherein the throughholes are spaced apart from the at least one chain link engaging portion of the flight bar.

10. The flight bar of claim 8, wherein:
    the flight bar has a substantially H-profile cross-section in a plane perpendicular to the flight bar longitudinal axis and at a position of each throughhole, the throughholes extending through the intermediate leg of the H-profile; and/or
    the flight bar has a solid cross-section in a plane perpendicular to the flight bar longitudinal axis and at a position of each chain link engaging portion.

11. The flight bar clamp of claim 1, wherein the sacrificial anode body is disposed in the sacrificial anode reception in a replaceable manner.

12. The flight bar clamp of claim 1, wherein the sacrificial anode body is formed as a solid body or as an annular body, for example a circular ring body.

* * * * *